(12) United States Patent
Indenbom et al.

(10) Patent No.: US 12,374,315 B2
(45) Date of Patent: Jul. 29, 2025

(54) TEMPORAL ALIGNMENT OF SIGNALS USING ATTENTION

(71) Applicant: Microsoft Technology Licensing, LLC, Redmond, WA (US)

(72) Inventors: Evgenii Indenbom, Tallinn (EE); Nicolae Ristea, Bucharest (RO); Ando Saabas, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 17/743,754

(22) Filed: May 13, 2022

(65) Prior Publication Data

US 2023/0368766 A1    Nov. 16, 2023

(51) Int. Cl.
| | |
|---|---|
| G10L 21/02 | (2013.01) |
| G10K 11/175 | (2006.01) |
| G10L 21/0208 | (2013.01) |
| G10L 21/0232 | (2013.01) |
| H04R 1/40 | (2006.01) |
| H04R 3/00 | (2006.01) |
| G10L 21/0216 | (2013.01) |

(52) U.S. Cl.
CPC .......... G10K 11/1752 (2020.05); G10L 21/02 (2013.01); G10L 21/0232 (2013.01); H04R 1/406 (2013.01); H04R 3/005 (2013.01); G10L 2021/02082 (2013.01); G10L 2021/02166 (2013.01); H04R 2410/01 (2013.01)

(58) Field of Classification Search
CPC ...................... G10L 21/02; G10L 2021/02082
See application file for complete search history.

(56) References Cited

PUBLICATIONS

Ma, L., Yang, S., Gong, Y., Wang, X., & Wu, Z. (2021). Echofilter: End-to-end neural network for acoustic echo cancellation. arXiv preprint arXiv:2105.14666.*
Kingma, D. P., & Ba, J. (2014). Adam: A method for stochastic optimization. arXiv preprint arXiv:1412.6980.*
Vaswani, A. (2017). Attention is all you need. Advances in Neural Information Processing Systems.*
Kothapally, V., Xu, Y., Yu, M., Zhang, S. X., & Yu, D. (2021). Joint neural AEC and beamforming with double-talk detection. arXiv preprint arXiv:2111.04904.*

(Continued)

*Primary Examiner* — Bryan S Blankenagel
(74) *Attorney, Agent, or Firm* — Schwegman Lundberg & Woessner, P.A.

(57) ABSTRACT

This document relates to alignment of time-varying signals, such as sound. One example includes a method or technique that can be performed on a computing device. The method or technique can include inputting a first time-varying signal and a second time-varying signal into a trained model. The method or technique can also include performing temporal alignment of the first time-varying signal to the second time-varying signal using an attention layer of the trained model to obtain a temporally-aligned first time-varying signal. The method or technique can also include enhancing the second time-varying signal based at least on the temporally-aligned first time-varying signal, and outputting the enhanced second time-varying signal.

18 Claims, 10 Drawing Sheets

(56) References Cited

PUBLICATIONS

Sun, X., Cao, C., Li, Q., Wang, L., & Xiang, F. (May 2022). Explore relative and context information with transformer for joint acoustic echo cancellation and speech enhancement. In ICASSP 2022-2022 IEEE International Conference on Acoustics, Speech and Signal Processing (ICASSP) (pp. 9117-9121). IEEE.*

Zhang, C., & Wu, X. (2020, November). Suppressing Residual Acoustic Echo Based on Deep BiGRU with Attention. In Proceedings of the 6th International Conference on Communication and Information Processing (pp. 135-139).*

Braun, et al., "Towards Efficient Models for Real-Time Deep Noise Suppression", In Proceedings of the IEEE International Conference on Acoustics, Speech and Signal Processing, Jun. 6, 2021, pp. 656-660.

Indenbom, et al., "Deep Model with Built-in Self-Attention Alignment for Acoustic Echo Cancellation", In Repository of arXiv:2208.11308v1, Aug. 24, 2022, 5 Pages.

Liu, et al., "SCA: Streaming Cross-attention Alignment for Echo Cancellation", In Repository of arXiv:2211.00589v1, Nov. 1, 2022, 5 Pages.

"International Search Report and Written Opinion issued in PCT Application No. PCT/US23/018566", Mailed Date: Jul. 31, 2023, 12 Pages.

Peng, et al., "Acoustic Echo Cancellation Using Deep Complex Neural Network with Nonlinear Magnitude Compression and Phase Information", In Proceedings of Interspeech, Aug. 30, 2021, pp. 4768-4772.

Peng, et al., "ICASSP 2021 Acoustic Echo Cancellation Challenge: Integrated Adaptive Echo Cancellation with Time Alignment and Deep Learning-Based Residual Echo Plus Noise Suppression", In Proceedings of IEEE International Conference on Acoustics, Speech and Signal Processing, Jun. 6, 2021, pp. 146-150.

Chung, et al., "Empirical Evaluation of Gated Recurrent Neural Networks on Sequence Modeling," in Proceedings of NIPS, 2014, pp. 09.

Clevert, et al., "Fast and Accurate Deep Network Learning by Exponential Linear Units (ELUs)," in Proceedings of ICLR, 2016, pp. 14.

Cutler, et al., "Crowdsourcing Approach for Subjective Evaluation of Echo Impairment," in Proceedings of ICASSP. IEEE, 2021, pp. 406-410.

Cutler, et al., "Interspeech 2021 Acoustic Echo Cancellation Challenge," in Proceedings of Interspeech, 2021, pp. 05.

Ephart, et al., "Looking to Listen at the Cocktail Party: A Speaker Independent Audio-Visual Model for Speech Separation," AcM Transactions on Graphics, vol. 37, No. 4, 2018, pp. 1-11.

Farhang, et al., "Adaptive Filters: Theory and Applications. John Wiley & Sons," 2013, pp. 802.

Fazel, et al., "CAD-AEC: Context-Aware Deep Acoustic Echo Cancellation," in Proceedings of ICASSP. IEEE, 2020, pp. 6919-6923.

Hochreiter, et al., "Long Short-Term Memory, " Neural Computation, vol. 9, No. 8, 1997, pp. 1735-1780.

Innaello, John, "Time Delay Estimation via Cross-Correlation in the Presence of Large Estimation Errors," IEEE Transactions on Acoustics, Speech, vol. 30, No. 6, 1982, pp. 998-1003.

Kingma, et al., "Adam: A Method for Stochastic Optimization," in Proceedings of ICLR, 2015, 15 Pages.

Ma, et al., "Acoustic Echo Cancellation by Combining Adaptive Digital Filter and Recurrent Neural Network," Proceedings of Interspeech, 2020, pp. 05.

Ma, et al., "Echo filter: End-to-end Neural Network for Acoustic Echo Cancellation," arXiv preprint arXiv:2105. 14666, 2021, pp. 05.

Purin, et al., "AECMOS: A Speech Quality Assessment Metric for Echo Impairment," in Proceedings of ICASSP. IEEE, 2022, pp. 901-905.

Sridhar, et al., "ICASSP 2021 Acoustic Echo Cancellation Challenge: Datasets, Testing Framework, and Results," in Proceedings of ICASSP, 2021, IEEE, pp. 151-155.

Watcharasupat, et al., "End-to-End Complex-Valued Mult dilated Convolutional Neural Network for Joint Acoustic Echo Cancellation and Noise Suppression," in Proceedings of ICASSP. IEEE, 2022, pp. 656-660.

Westhausen, et al., "Acoustic Echo Cancellation with the Dual-Signal Transformation LSTM Network," in Proceedings of ICASSP. IEEE, 2021, pp. 7138-7142.

Wisdom, et al., "Differentiable Consistency Constraints for Improved Deep Speech Enhancement," in Proceedings of ICASSP, IEEE, 2019, pp. 900-904.

Zhang, et al., "A Deep Learning Approach to Multi-Channel and Multi-Microphone Acoustic Echo Cancellation," Proceedings of Interspeech, pp. 1139-1143, 2021.

Zhang, et al., "Deep Adaptive AEC: Hybrid of Deep Learning and Adaptive Acoustic Echo Cancellation," in Proceedings of ICASSP. IEEE, 2022, pp. 756-760.

Zhang, et al., "Deep Learning for Joint Acoustic Echo and Noise Cancellation with Nonlinear Distortions," in Proceedings of Interspeech, 2019, pp. 4255-4259.

Zhao, et al., "A Deep Hierarchical Fusion Network for Fullband Acoustic Echo Cancellation," in Proceedings of ICASSP. IEEE, 2022, pp. 9112-9116.

* cited by examiner

Training Workflow 200

TEMPORAL ALIGNMENT OF SIGNALS USING ATTENTION

BACKGROUND

Machine learning can be used to perform a broad range of tasks, such as natural language processing, information retrieval, and image processing. One important application of machine learning involves processing of time-varying signals, such as audio or video signals. However, conventional machine learning techniques for processing time-varying signals have various drawbacks, as discussed more below.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for alignment of time-varying signals. One example includes a method or technique that can be performed on a computing device. The method or technique can include inputting a first time-varying signal and a second time-varying signal into a trained model. The method or technique can also include performing temporal alignment of the first time-varying signal to the second time-varying signal using an attention layer of the trained model to obtain a temporally-aligned first time-varying signal. The method or technique can also include enhancing the second time-varying signal based at least on the temporally-aligned first time-varying signal, and outputting the enhanced second time-varying signal.

Another example includes a system having a hardware processing unit and a storage resource storing computer-readable instructions. When executed by the hardware processing unit, the computer-readable instructions can cause the system to access training data including first time-varying signals, second time-varying signals, and target time-varying signals. The computer-readable instructions can also cause the system to input the first time-varying signals and the second time-varying signals into a model having an attention layer that aligns the first time-varying signals to the second time-varying signals to obtain temporally-aligned first time-varying signals. The computer-readable instructions can also cause the system to enhance the second time-varying signals based at least on the temporally-aligned first time-varying signals to obtain enhanced second time-varying signals. The computer-readable instructions can also cause the system to modify parameters of the model based at least on a difference between the enhanced second time-varying signals and the target time-varying signals.

Another example includes a computer-readable storage medium. The computer-readable storage medium can store instructions which, when executed by a computing device, cause the computing device to perform acts. The acts can include receiving a first time-varying signal and a second time-varying signal. The acts can also include aligning the first time-varying signal to the second time-varying signal using an attention layer of a neural network.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
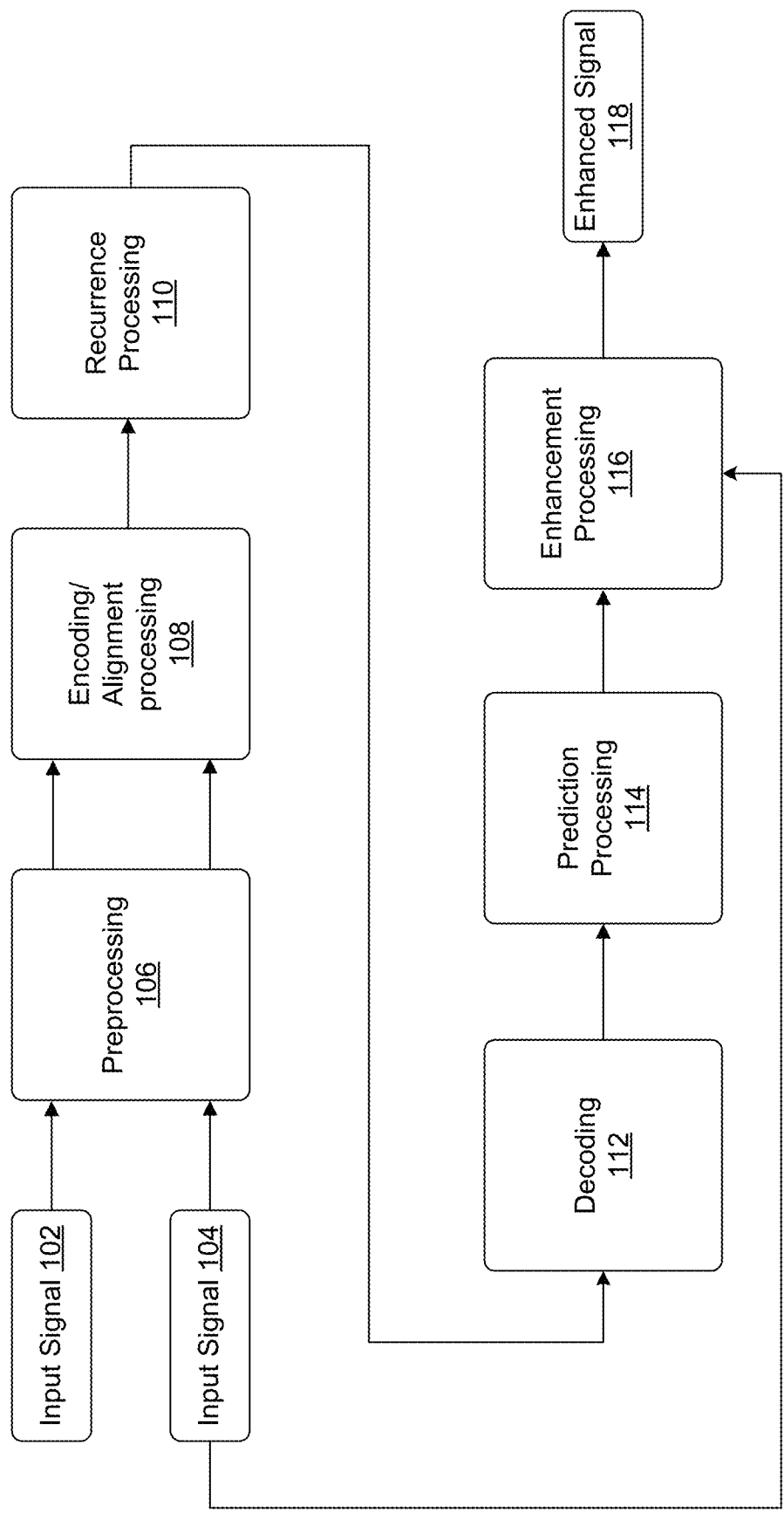
FIG. 1 illustrates an example workflow for using a model to align and enhance time-varying signals, consistent with some implementations of the present concepts.

Some signal processing applications involve temporally aligning two or more time-varying signals, such as audio or video signals. One way to align time-varying signals is to estimate the delay between the time-varying signals using cross-correlation techniques. The estimated delay can then be used to temporally align the time-varying signals prior to enhancement using a machine-learning model.

For instance, consider a microphone that picks up a far end signal from a speaker in the same room as the microphone, causing echoes. One way to remove echoes from the microphone signal is to employ digital signal processing techniques based on cross-correlation analysis to estimate the delay between the microphone signal and the far end signal. Prior to echo removal by a machine learning model, the far end signal can be delayed using an external delay module to temporally align with the microphone signal. Then, echo cancellation processing can be performed on the aligned signals using the machine learning model.

Using an external delay module to implement cross-correlation alignment of time-varying signals generally works well when the delay between the time-varying signals is predictable. However, for many applications, the delay can vary unpredictably. For instance, hardware latency and/or software buffering of voice calls can result in relatively high variance in the delay between the microphone and far end signals. In addition, a person may change rooms during a voice call, which can also change the delay between the microphone and far end signals.

Traditional cross-correlation alignment techniques tend to do a poor job of estimating delay in these scenarios. When the estimated delay between two signals is inaccurate, the signals cannot be accurately aligned. As a consequence, signal enhancement models that rely on temporally-aligned signals, such as echo cancellation models, tend to fare poorly when the delay between two signals is difficult to predict.

The disclosed implementations generally offer techniques for aligning two or more time-varying signals using an attention layer of a machine learning model (e.g., a deep neural network) that also perform signal enhancement. For instance, the time-varying signals can be projected into a latent space. The attention layer can perform alignment processing based on the projections. Subsequent operations, such as enhancement processing to remove echoes or noise, can be performed after the alignment processing.

By performing the alignment inside of a machine learning model that also performs enhancement processing, the layers that perform signal alignment can be trained jointly with the layers that implement the enhancement processing. In addition, as discussed more below, the disclosed implementations allow for a "soft" alignment where multiple delay estimates can be weighted relative to one another, instead of using a single hard delay estimate from an external delay module. These characteristics of attention-based alignment allow for graceful handling of delay scenarios that tend to cause difficulty for traditional cross-correlation based techniques. As a consequence, the disclosed attention-based alignment techniques can improve the outcomes of subsequent enhancement processing, as discussed more below.

Definitions

For the purposes of this document, the term "signal" refers to a function that varies over time or space. A signal can be represented digitally using data samples, such as audio samples, video samples, or one or more pixels of an image. A "time-varying signal" refers to a function that varies over time, such as an audio, video, sonar, or radar signal. A time-varying signal can be represented in a time domain, e.g., with samples representing the amplitude of the signal when sampled. A time-domain signal can also be represented in a frequency domain, e.g., with frequency information representing the extent to which the time-domain signal lies within different frequency bins. In some cases, time-domain representations can be converted to frequency-domain representations that include phase information, which can allow for recovery of the original time-domain representation.

The term "microphone signal" refers to an audio signal captured by a microphone. The term "far end signal" refers to the signal that is played back by a speaker in a room. A microphone can pick up the far end signal as distorted by the room impulse response. The term "near end signal" refers to an ideal microphone signal, the audio signal that an ideal microphone that does not introduce distortions would pick up in the absence of noise and echo. A "predicted near end signal" is an estimate of the near end signal. A predicted near end signal can be obtained by removing echoes caused by the far end signal and/or removing noise introduced by hardware or software artifacts or other noise sources. A "target signal" is a training signal (e.g., ideal) signal that a model can be trained to produce. In the case of audio processing, the target signal can be an example near end signal that represents the enhanced audio signal that a model is trained to produce given a microphone signal and a far end signal as input.

A "data enhancement model" refers to a model that processes data samples from an input signal to enhance the perceived quality of the signal. For instance, a data enhancement model could remove noise or echoes from audio data, or a data enhancement model could sharpen image or video data. The term "quality estimation model" refers to a model that evaluates an input signal to estimate how a human might rate the perceived quality of the signal. For example, a quality estimation model could estimate the quality of an unprocessed or raw audio signal, and can output a synthetic label characterizing the quality of the signal with respect to impairments such as device distortion, background noise, and/or room reverberation. A quality estimation model could also evaluate a processed audio signal that has been output by a particular data enhancement model to remove noise and/or echoes from a noisy input signal, and the quality estimation model could output a synthetic label reflecting how effective the particular data enhancement model was at removing noise and/or echoes as well as the extent to which the particular data enhancement model may have introduced undesirable artifacts when removing the noise. Here, the term "synthetic label" means a label at least partially generated by a machine, where a "manual" label is provided by a human being.

The term "model" is used generally herein to refer to a range of processing techniques, and includes models trained using machine learning as well as hand-coded (e.g., heuristic-based) models. For instance, a machine-learning model could be a neural network, a support vector machine, a decision tree, etc. Whether machine-trained or not, data enhancement models can include codecs or other compression mechanisms, audio noise suppressors, echo removers, distortion removers, image/video healers, low light enhancers, image/video sharpeners, image/video denoisers, etc., as discussed more below.

The term "impairment" is used herein to refer to any characteristic of a signal that reduces the perceived quality of that signal. Thus, for instance, an impairment can include noise or echoes that occur when recording an audio signal, or blur or low-light conditions for images or video. One type of impairment is an artifact, which can be introduced by a data enhancement model when removing impairments from a raw data sample. Viewed from one perspective, an artifact can be an impairment that is introduced by processing an input signal to remove other impairments. Another type of impairment is a recording device impairment introduced into a raw input signal by a recording device such a microphone or camera. Another type of impairment is a capture condition impairment introduced by conditions under which a raw input signal is captured, e.g., room reverberation for audio, low light conditions for image/video, etc.

Machine Learning Overview

There are various types of machine learning frameworks that can be trained to perform a given task, such as estimating the quality of a signal or enhancing a signal. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, decoding, alignment, prediction, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned. Note that two trained models can share the same model structure and yet have different values for the internal parameters, e.g., if the two models are trained on different training data or if there are underlying stochastic processes in the training process.

Signal Enhancement With Alignment Processing Overview

FIG. 1 shows an example of a signal enhancement workflow 100 with internal alignment processing. A first input signal 102 and a second input signal 104 are input to preprocessing 106. The preprocessing can output features representing the input signals to encoding/alignment processing 108, where the input signals can be encoded and aligned as discussed further below. For instance, the features can include mel spectrogram or linear audio spectrogram features representing frequency components of the input signals. These features can be computed over frames of each of the input signals, where each frame includes a specified number of amplitude samples for each input signal. For instance, as discussed more below, one implementation uses frames of 320 amplitude samples for each of the input signals, sampled at 16 khz, where each frame is 20 milliseconds long. A 10 millisecond hop length can be employed, so that each subsequent frame includes 160 new samples and 160 old samples.

The features for each frame can be projected into a linear space during encoding/alignment processing 108. For instance, convolutional operations can be employed to perform a projection on the features for each frame of the first input signal and each frame of the second input signal. For instance, projections can be obtained using a linear convolution with a nonlinear activation function to produce features that can be input to the next layer. The projection or "encoding" of each frame of the second input signal can be compared to encodings of multiple frames of the first input signal. For instance, as discussed more below, encodings for one second worth of frames of the first input signal (100 hops) can be compared to an encoding of a single frame of the second input signal. The encodings of the frames of the first input signal can be weighted based on their respective similarity to the encoded single frame of the second input signal. The weights can be used to construct a weighted encoding of the first input signal frame that represents alignment of the first input signal to the second input signal. Subsequent further encoding processing can be performed on the weighted first input signal frame and the second input signal frame using further convolution operations, as described more below. Each convolution operation can reduce the number of frequency bins of its received input.

After encoding and alignment, recurrence processing 110 can process the current encodings of the first and second input signals based on hidden states that are maintained from previous encodings to produce outputs that are sent to decoding 112. Generally speaking, the use of recurrence processing allows a model to consider previous inputs when processing a current input. This can be useful in signal processing scenarios where certain artifacts tend to exhibit a memory effect, such as vibrations transmitted from a loudspeaker to a microphone. The recurrence processing can manipulate the projections of the received frames to provide input to decoding 112.

At decoding 112, the encodings are decoded, e.g., using one more transpose convolution operations. The transpose convolution operations can produce an output having a greater number of frequency bins than the input received by the transpose convolution operation. In addition, decoding can also involve skip connections among the transpose convolution operations, as discussed more below.

The output of the decoding processing 112 can be input to prediction processing 114. Generally speaking, the prediction processing can predict values that can be used to enhance the second input signal 104. For instance, for audio applications, the predicted values can include suppression masks, where each mask is a coefficient of a corresponding frequency bin.

The values predicted during prediction processing 114 can be used during enhancement processing 116 to obtain an enhanced signal 118. For instance, the suppression masks described above can be used to suppress individual frequency bins of the second input signal 104, resulting in an enhanced audio signal. In some implementations, the enhanced audio signal may have reduced echo and/or noise components that are removed by the enhancement processing.

Generally speaking, some or all of the processing of signal enhancement workflow 100 can be performed internally within a machine learning model such as a deep neural network. As discussed more below, incorporating alignment processing into a model that is employed for signal enhancement can allow an alignment layer (e.g., an attention layer) of the model to be jointly trained with other layers of the model. As a consequence, the alignment layer can be trained to align input signals 102 and 104 in a manner that facilitates subsequent enhancement processing. In addition, the weighted frames used to represent first input signal 102 can include components of multiple actual frames. Thus, for instance, if the correct alignment of the signals involves two frames of the first input signal straddling a particular frame of the second input signal, the alignment layer can learn to represent this as a weighted combination of both frames. In contrast, prior approaches that use separate delay modules simply delay a signal by a specified amount and thus perform "hard" alignment of a single frame of one signal to a single frame of another signal.

Training Overview

Figure 2:
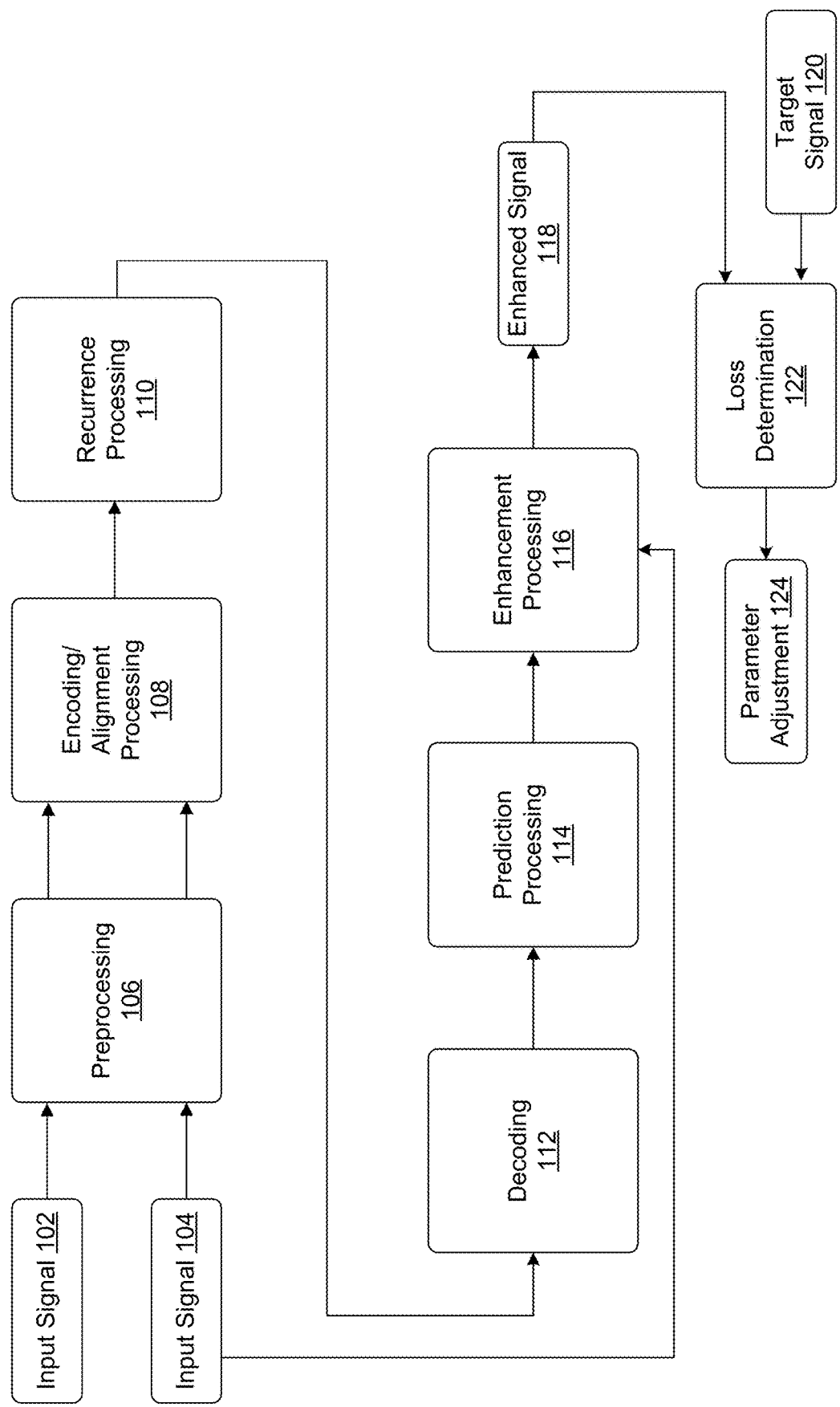
FIG. 2 illustrates an example workflow for training a model to align and enhance time-varying signals, consistent with some implementations of the present concepts.

FIG. 2 shows an example of a training workflow 200. Training workflow 200 generally involves signal enhancement as described above with respect to FIG. 1, with additional functionality as described below.

As described above, first input signal 102 and second input signal 104 can be aligned prior to enhancing second input signal 104, resulting in enhanced signal 118. A target signal 120 can represent an ideal signal that the enhancement is trained to replicate. For instance, the target signal can be a clean microphone signal with little or no impairments, such as echoes or noise.

Loss determination 122 can be used to calculate a loss based on the difference between the enhanced signal 118 and the target signal 120. Based on the loss, parameter adjustment 124 can be performed to any or all internal parameters of encoding/alignment processing 108, recurrence processing 110, decoding processing 112, and/or prediction processing 114. Generally speaking, the larger the difference between the target signal and the enhanced signal, the greater the loss will be. The parameter adjustments can be proportional to the loss gradient with respect to the individual parameters. Examples of a loss function and parameter adjustment techniques are described in more detail below.

Specific Implementation for Echo Cancellation

The above-described signal enhancement and training workflows can be employed for a wide range of applications involving different types of time-varying signals. The following provides a specific implementation that can be employed for echo cancellation of audio signals.

Figure 3:
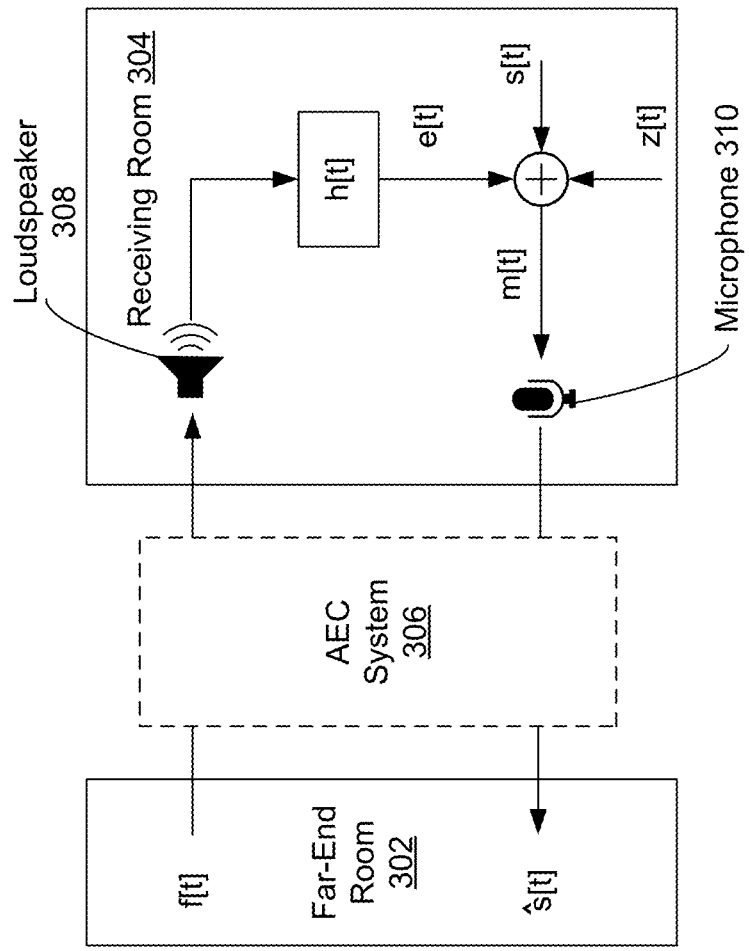
FIG. 3 illustrates an example echo cancellation scenario, consistent with some implementations of the disclosed techniques.

FIG. 3 is a diagram of an acoustic echo cancellation scenario 300. Scenario 300 shows a far end room 302 communicating with a receiving room 304 using acoustic echo cancellation to enhance call quality. An acoustic echo cancellation system 306 can be formally described as follows. A far end reference signal f(t) is transmitted to the receiving room, played back through a loudspeaker 308 and then picked up by a microphone 310 as a microphone signal m(t) via an acoustic echo path. A linear echo path can be emulated by the room impulse response, and a nonlinear distortion model can be used to emulate nonlinear echo paths. The captured microphone signal m(t), which includes near end signal s(t), background noise z(t) and echo e(t), is further received by the far end user as s(t). Note that that the echo e(t) component from the microphone signal m(t) is a delayed version of the received reference far end signal f(t), because of the echo propagation path (from loudspeaker to microphone) and hardware or software related latency. Therefore, between the far end and near end users an acoustic echo cancellation system can be integrated to remove undesired echos, using the microphone and reference far end signals as inputs to output an enhanced microphone signal.

Figure 4:
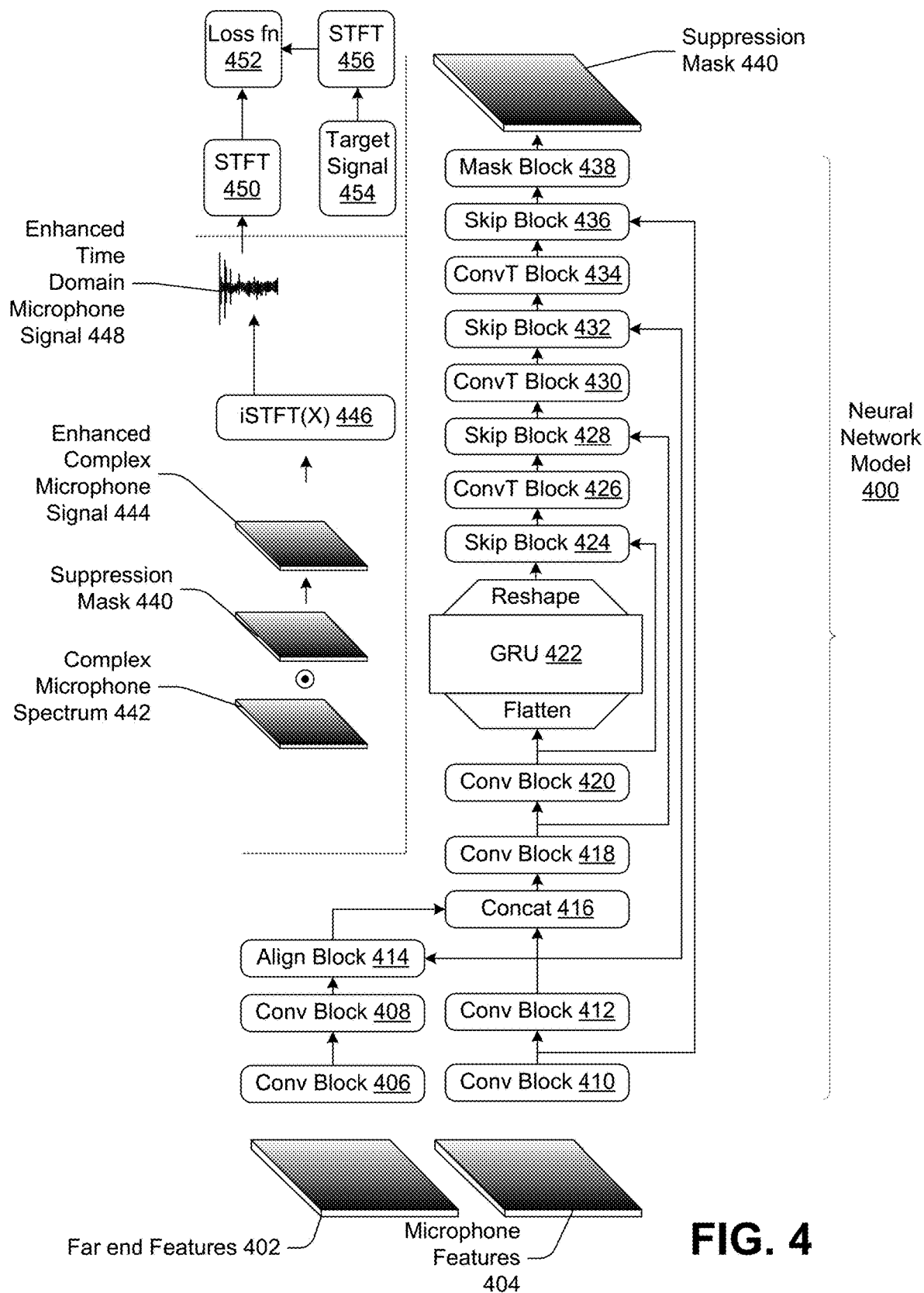
FIG. 4 illustrates an example echo cancellation neural network, consistent with some implementations of the present concepts.

Specific Network Architecture. FIG. 4 illustrates a neural network model 400 that can be employed to output a suppression mask, which in turn can be used to predict an enhanced microphone signal as described more below. To obtain input features for the neural network model, audio signals can be sampled at 16 kHz and preprocessing can be performed for reference far end and microphone signals. The input features to the neural network model can include log power spectra computed with a squared root Hann window.

The disclosed implementations can be used to adapt audio enhancement models to perform acoustic echo cancellation using a self-attention mechanism for built-in deep alignment. As discussed more below, neural network model 400 can include an encoder, a decoder, and a recurrent module. The following uses the notation c, $c_1$, $c_2$, p, t, f $\in \mathbb{N}$ to denote arbitrary axis lengths. Additional information on neural network techniques for enhancing audio signals that can be adapted as described herein can be found in Braun, et al., "Towards Efficient Models for Real-Time Deep Noise Suppression," in *ICASSP* 2021-2021 *IEEE International Conference on Acoustics, Speech and Signal Processing (ICASSP) IEEE*, 2021, pp. 656-660.

Encoder. In the encoding stage, the network includes two branches, a first branch that receives far end features 402 as input and a second branch that receives microphone features 404 as input. Each conv block 406, 408, 410, and 412 can include a convolutional layer, a batch-norm layer, and an exponential linear unit (ELU) activation function. (Clevert, et al., "Fast and Accurate Deep Network Learning by Exponential Linear Units (ELUS)," *arXiv preprint, arXiv:* 1511.07289, 2015). The far end branch can include two cony blocks 406 and 408 followed by the align block 414, which take as input the far end feature maps and the depth-corresponding feature maps from the microphone branch. Consequently, the aligned far end maps can be concatenated 416 to the microphone branch and processed by two more conv blocks 418 and 420. Example numbers of kernels for the microphone conv blocks can be 16, 40, 72, and 32, respectively. The far end branch can be composed by 8 and 24 filters. The convolution kernels can have a size of 4×3 and a stride of 1×2, reducing the number of bins along the frequency axis. Each convolution can be causal, e.g., padding can be performed such that no look-ahead is used.

Recurrent block. Between the encoder and decoder sits a recurrent layer, which includes a gated recurrent unit 422 fed with feature maps flattened along the channel and frequency dimensions. Formally, the input $X \in \mathbb{R}^{c \times t \times f}$ can be flattened into $X \in \mathbb{R}^{t \times (cf)}$. Replacing a GRU layer with a long short-term memory (LSTM) layer may not necessarily bring significant performance improvements, and in some cases the GRU layer may provide a beneficial trade-off between performance and computational complexity. Afterwards, the output of the recurrent layer is reshaped back to $X \in \mathbb{R}^{c \times t \times f}$.

Skip block. Replacing a classical skip connection based on concatenation or summing with a trainable channel-wise scaling and bias can improve network performance in some cases at negligible additional cost. Moreover, this approach allows the use of an asymmetric encoder-decoder blocks, by adapting the number of encoding channels to the number of corresponding decoding channels. Considering $X \in \mathbb{R}^{c_1 \times t \times f}$ the decoder input and $Y \in \mathbb{R}^{c_2 \times t \times f}$ the corresponding encoder input, a skip block can be defined as follows:

$$Z = X + Conv(Y),$$

where $Z \in \mathbb{R}^{c_1 \times t \times f}$ and Conv(·) has $c_1$ kernels of size 1×1 applied with stride 1×1.

Decoder. The decoding stage can include alternating skip blocks 424, 428, and 432 and cony transpose blocks 426, 430, and 434, followed by a last skip block 436 and mask block 438. The reshaped output from GRU, $Z \in \mathbb{R}^{c \times t \times f}$ is combined with the corresponding features from the encoder (into the skip block) and fed into the transpose cony block. Each transpose cony block can include a transposed convolutional layer, followed by a batch norm and an ELU activation function. For each transpose convolutional layer, a non-causal kernel, having size of 1×3 can be employed to compute features along frequency dimension. The stride can be as described above for the encoder, while the number of filters for convolutional blocks can be 32, 48 and 48. Subsequently, the output of last skip block 436 can be processed by the mask block 438. The mask block can include a convolutional layer with a single filter of 1×3, followed by a sigmoid activation. Moreover, a learnable parameter can be added to the mask block, which can be multiplied by the output mask. This allows model to have an internal learnable control gain that can compensate for potential over-suppression by the mask block.

Figure 5:
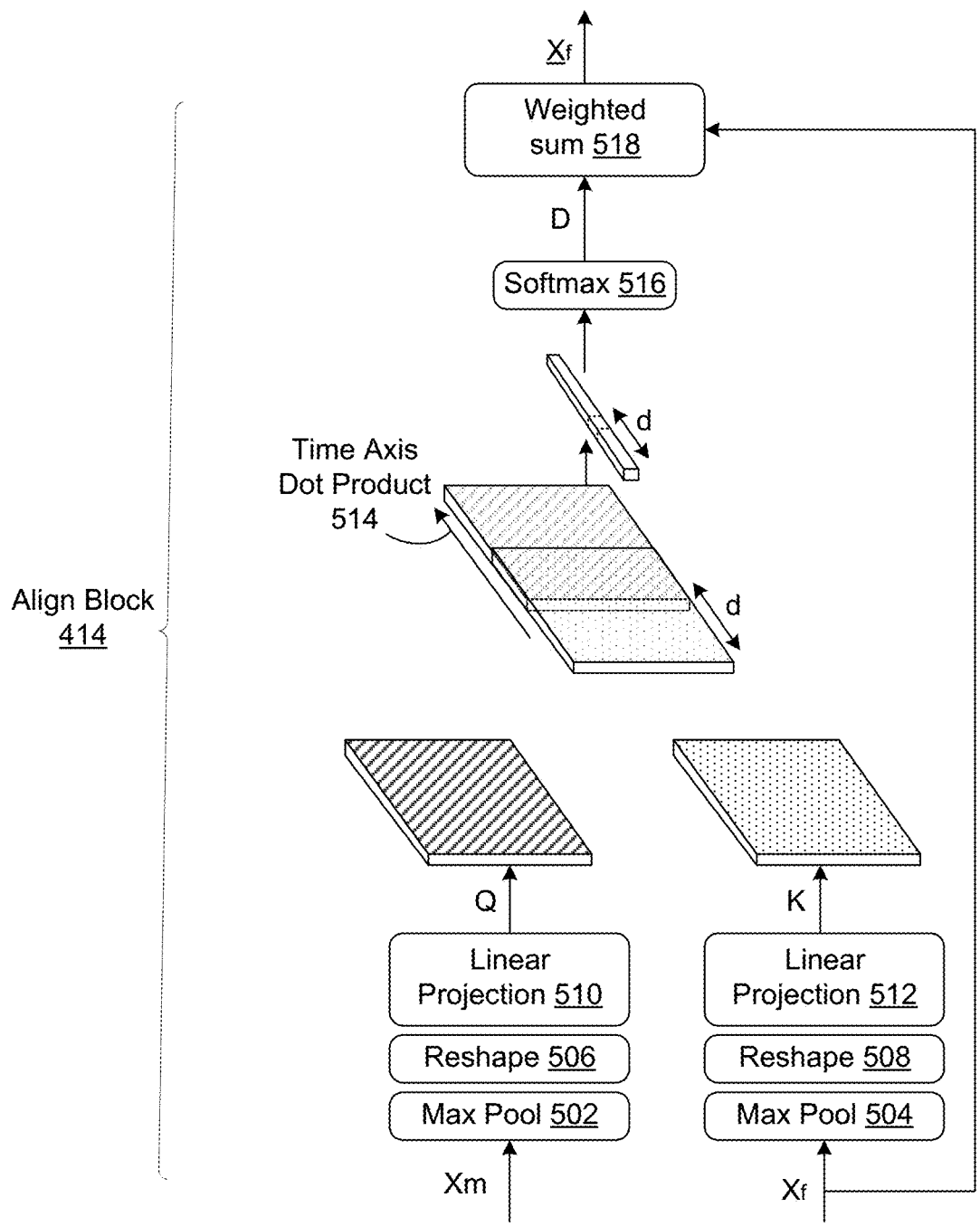
FIG. 5 illustrates an example alignment block, consistent with some implementations of the present concepts.

Align block. An example align block 414 that can be employed to synchronize microphone and far end latent features is shown in FIG. 5. Let $X_m \in \mathbb{R}^{c \times t \times f}$ be the microphone features and $X_f \in \mathbb{R}^{c \times t \times f}$ the far end features. First, the feature maps can be reduced with max-pooling layers 502 and 504 (e.g., having a kernel size of 1×4) along the frequency dimension to reduce computation cost of alignment. Next, the features can be reshaped 506 and 508 such that $X_{m'} \in$ $$\mathbb{R}^{t \times (\frac{f}{4} \cdot c)}$$

and $X_{f'} \in$ $$\mathbb{R}^{t \times (\frac{f}{4} \cdot c)}.$$

Next, linear projection 510 can project the microphone features projected into queries $Q \in \mathbb{R}^{t \times p}$ and linear projection 512 can project the far end features into keys $K \in \mathbb{R}^{t \times p}$. The K tensor can be zero-padded at the beginning and cropped at the end with the same d value, generating a synthetic delay. Afterwards, a time axis dot product 514 can be performed for delayed K and Q. This procedure can be computed for each delay index d from a specific interval, given by the maximum supported delay $d_{max}$, conducting to a result vector of length $d_{max}$. The vector is further used in softmax activation 516, predicting the most likely delay distribution $D \in \mathbb{R}^{d_{max}}$. Afterwards, the aligned far end features $\underline{X}_f \in \mathbb{R}^{c \times t \times f}$ are computed through a weighted sum 518 on the time axis with the corresponding delay probability from D. More exactly, the $X_f$ is delayed, multiplied with the corresponding weight factor from D and added to the final result $\underline{X}_f$. Note that that having a weighted sum rather than a hard selection can improve the robustness to wrong delay estimations by allowing flat delay distributions.

Prediction. Referring back to FIG. 4, the output of neural network model 400 is a suppression mask 440 that can be used to enhance the microphone signal by removing undesired components. The output suppression mask can be applied to the complex spectrum of the microphone signal 442, resulting in the enhanced complex microphone signal 444. Next, the inverse short-time Fourier transform (STFT) 446 can be computed to obtain the enhanced time domain microphone signal 448.

Loss Function: The neural network model 400 can be trained to encourage STFT consistency by propagating the enhanced time domain microphone signal 448 again through STFT 450. (Wisdom, et al., "Differentiable Consistency Constraints for Improved Deep Speech Enhancement," in *ICASSP* 2019-2019 *IEEE International Conference on Acoustics, Speech and Signal Processing (ICASSP)*. IEEE, 2019, pp. 900-904). In the training stage, the reconstructed complex spectrum of the enhanced signal is fed into the loss function 452 with a target signal 454 (in time domain) processed by STFT 456. The network can be optimized by minimizing the complex compressed mean-squared error loss, which blends the magnitude with a phase-aware term, which was found in the experiments described below found to be superior to other losses (Ephrat, et al., "Looking to Listen at the Cocktail Party: a Speaker-Independent Audio-Visual Model for Speech Separation," ACM Transactions on Graphics (TOG), Vol. 37, No. 4, pp. 1-11, 2018). Formally, the loss function can be given by:

$$\mathcal{L} = \beta \sum_{n,k} ||S|^c - |\hat{S}|^c|^2 + (1-\beta) \sum_{n,k} ||S|^c e^{j\phi_s} - |\hat{S}|^c e^{j\phi_{\hat{s}}}|^2$$

where c=0.3 is a compression factor, β=0.7 is a weighting factor between complex and magnitude-based losses. The dependency of S(k, n) and Ŝ(k, n) on the time and frequency indices n, k is omitted for brevity. Other loss functions with other magnitude terms and/or phase-aware terms can also be employed.

Experimental Results

The following section describes experiments conducted using the network shown in FIG. 4 and results obtained via the experiments. To ensure generalization ability, the training data described below were synthesized online with random parameters for each sample (e.g., signal-to-noise ratio, distortion, gain, signal-to-echo ratio).

Training sets. The network was trained on data from the AEC challenge (Cutler, et al., "Interspeech 2021 Acoustic Echo Cancellation Challenge," in *Proc. Interspeech*, 2021). The training set contains more than 10,000 real scenarios of audio (e.g., speech clips) in diverse environments collected with different devices.

Test sets. Testing was performed on the blind test set from Cutler, et al., "Interspeech 2021 Acoustic Echo Cancellation Challenge," in *Proc. Interspeech*, 2021, which contains real world recordings in diverse scenarios. The far end single talk blind test set (Cutler, et al., "Interspeech 2021 Acoustic Echo Cancellation Challenge," in *Proc. Interspeech*, 2021) was split into two: FEST-HD, which contains 27 samples with difficult delay estimation cases (e.g., long delays or variable delays, as indicated by the authors), and FEST-GEN, which contains 273 samples with other types of scenarios (e.g., non-linear-distortions, stationary-noise). Moreover, two synthetic data sets containing 500 samples each were generated to specifically address long delay cases. In LD-300-500 the delays were randomly and uniformly distributed in 300-500 ms, while for LD-500-1000 in 500-1000 ms.

Evaluation metrics. AECMOS was employed to test the removal capacity of echoes (Purin, et al., "Aecmos: A Speech Quality Assessment Metric for Echo Impairment," *arXiv preprint, arXiv:*2110.03010, 2021). The metric reflects a pseudo-subjective quality of samples, being highly correlated with human subjective opinion. To assess the echo cancellation ability in far end single talk scenarios, echo return loss enhancement (ERLE) was also employed. The enhanced samples were also submitted to human raters in order to obtain the MOS score (K. Sridhar, R. Cutler, A. Saabas, T. Parnamaa, M. Loide, H. Gamper, S. Braun, R. Aichner, and S. Srinivasan, "Icassp 2021 acoustic echo cancellation challenge: Datasets, testing framework, and results," in *ICASSP* 2021-2021 *IEEE International Conference on Acoustics, Speech and Signal Processing (ICASSP)*, IEEE, 2021, pp. 151-155. Each sample was annotated by 5 distinct raters.

Hyper-parameter tuning. For feature generation, a squared root Hann window of length 20 ms, a hop length of 10 ms and a discrete Fourier transform length of 320 was employed. The following results use the name "Align-CRUSE" to refer to the model shown in FIG. 4, and the name "CRUSE" to refer to the model described in "Towards Efficient Models for Real-Time Deep Noise Suppression," in *ICASSP* 2021-2021 *IEEE International Conference on Acoustics, Speech and Signal Processing (ICASSP) IEEE*, 2021, pp. 656-660.

To obtain the following results, CRUSE and Align-CRUSE models were trained in the same fashion. The Adam optimizer was employed for training all networks, with batches of 400 samples for 150 epochs, with a learning rate of $1.5 \cdot 10^{-4}$ and a weight decay of $5 \cdot 10^{-6}$. A one second maximum delay was set as $d_{max}=100$.

Results. Results of the Align-CRUSE model on the synthetically generated test sets LD-300-500, LD-500-1000 and AEC challenge (Cutler, et al., "Interspeech 2021 Acoustic Echo Cancellation Challenge," in *Proc. Interspeech,* 2021) single talk test set are provided below, split into FEST-HD and FEST-GEN. The baseline CRUSE model was tested on non-aligned data (CRUSE), online aligned data (CRUSE †) and globally aligned data (CRUSE ‡‡). The inference time is in milliseconds per frame. For both AECMOS and ERLE metrics, larger values imply better results. Table 1 below shows results Align-CRUSE model on the AEC (double talk) challenge test set, against CRUSE‡ baseline method.

critical aspect for real-time processing. Overall, Align-CRUSE improves the AEC in both single talk and double talk scenarios. Considering that the performance boost comes with a communication pipeline simplification and a 10% smaller inference time, Align-CRUSE could be employed successfully for real-time applications. One additional observation is that Align-CRUSE mostly predicts a constant delay during the experiments, but there are times when softer delay estimates are provided by the model.

In addition to far end single talk tests, models were compared on the blind double-talk data set from the AEC Challenge (Cutler, et al., "Interspeech 2021 Acoustic Echo Cancellation Challenge," in Proc. Interspeech, 2021), measuring AECMOS and MOS. These results are shown in Table 2 below:

Table 1 highlights the importance of alignment by conducting experiments on the CRUSE architecture tested on unaligned, real-time aligned (CRUSE †) and globally aligned data (CRUSE ‡‡).

| Method | LD-300-500 | | LD-500-1000 | | FEST-HD | |
|---|---|---|---|---|---|---|
| | AECMOS | ERLE | AECMOS | ERLE | AECMOS | ERLE |
| CRUSE | 2.31 | 7.63 | 2.21 | 3.93 | 2.91 | 19.80 |
| CRUSE † | 3.89 | 26.30 | 3.57 | 17.57 | 3.78 | 34.54 |
| CRUSE ‡‡ | 3.99 | 35.84 | 3.84 | 33.50 | 4.30 | 45.58 |
| Align-CRUSE | 4.54 | 42.88 | 4.44 | 39.37 | 4.54 | 52.80 |

| Method | FEST-GEN | | Inference | |
|---|---|---|---|---|
| | AECMOS | ERLE | Time(ms) | #Params |
| CRUSE | 4.32 | 42.43 | 0.216 | 0.74M |
| CRUSE † | 4.42 | 42.55 | 0.216 | 0.74M |
| CRUSE ‡‡ | 4.38 | 43.38 | 0.216 | 0.74M |
| Align-CRUSE | 4.46 | 45.82 | 0.196 | 0.75M |

Note
that the global alignment method is based on the entire audio sample and is thus not generally suitable for real-time applications. Nevertheless, these results are included as a stronger baseline. As shown above, Align-CRUSE significantly surpasses the baseline models, including the globally aligned CRUSE ‡‡ model. On the synthetic LD-300-500 and LD-500-1000 data sets, Align-CRUSE surpasses CRUSE ‡‡ by up to 0.6 AECMOS and 7 dB ERLE. Against other baselines models, the difference is even more significant.

To measure the generalization capacity of Align-CRUSE, the model was tested on the real-world recordings from FEST-HD and FEST-GEN data sets. For both FEST-GEN and FEST-HD data sets, Align-CRUSE obtained better results than the baselines. Compared to CRUSE‡, the improvement is 7.22 dB ERLE and 0.24 AECMOS for FEST-HD and 2.44 dB ERLE and 0.08 AECMOS for FEST-GEN. The results show that having a robust delay estimator is important for difficult delay estimation cases. The self-aligning approach of Align-CRUSE obtains superior results in all AEC data sets, consistently surpassing the CRUSE‡ baseline in difficult delay estimation cases, while also improving the overall performance.

Additionally, Table 1 shows the number of parameters and the inference time per frame on a CPU Intel Core i7 10600K@3.8 GHz. Align-CRUSE is faster than the baseline by approximately 10% per frame, while having with only 0.01M parameters more. Thus, Align-CRUSE provides significantly better results, especially in long and hard delay estimation cases, while assuring a lower inference time,

| | AEC | |
|---|---|---|
| Method | AECMOS | MOS |
| CRUSE ‡ | 4.49 | 4.35 |
| Align-CRUSE | 4.56 | 4.40 |

Here, only CRUSE ‡ is included as a baseline in these results, since CRUSE tested on unaligned data is considerably worse (see Table 1) and CRUSE ‡‡ is not feasible for real-time applications. As shown in Table 2, Align-CRUSE model surpasses the CRUSE ‡ network in the double talk scenario for both AEC performance metrics.

Example System

Figure 6:
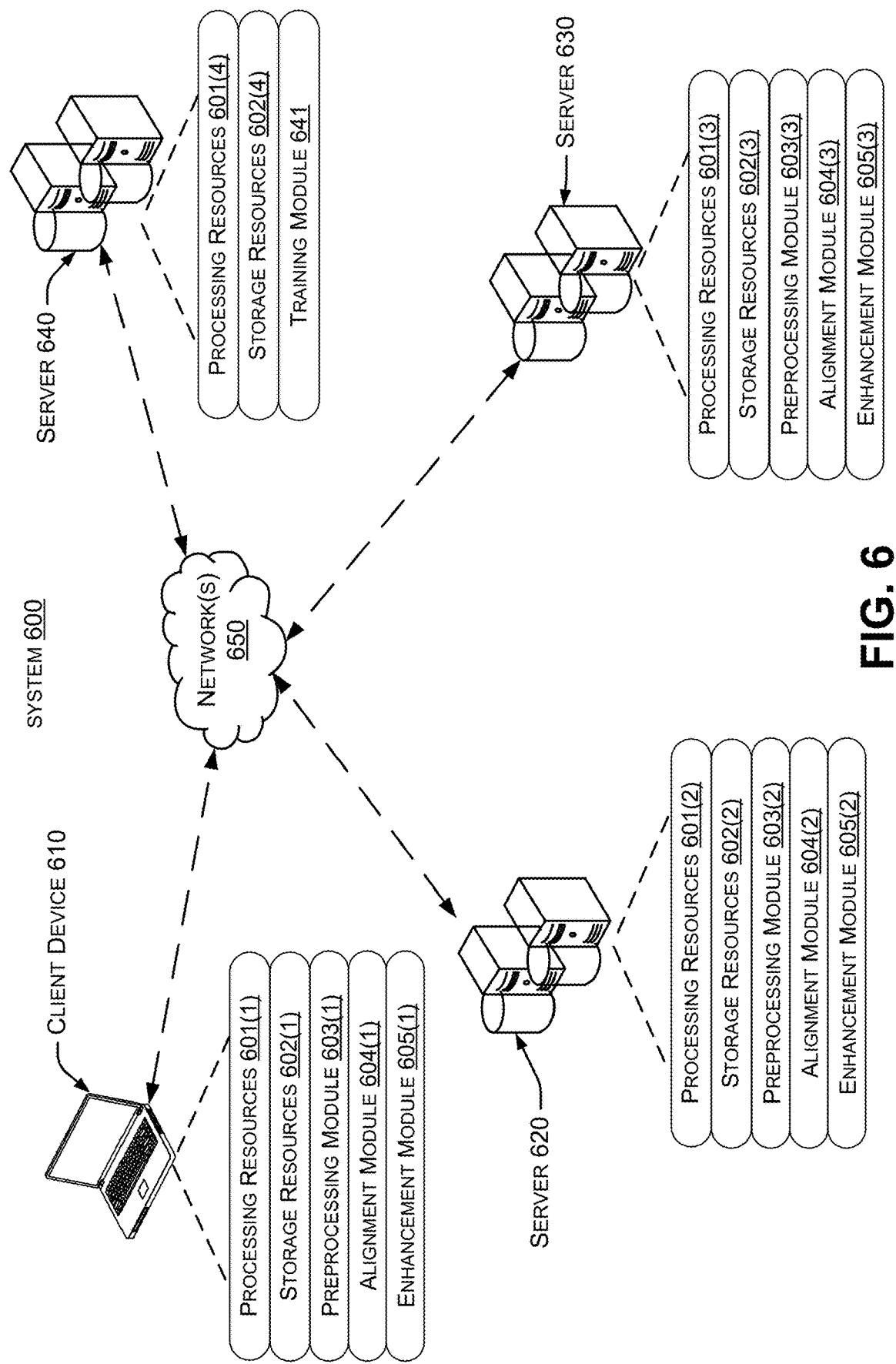
FIG. 6 illustrates an example system, consistent with some implementations of the disclosed techniques.

The present implementations can be performed in various scenarios on various devices. FIG. 6 shows an example system 600 in which the present implementations can be employed, as discussed more below.

As shown in FIG. 6, system 600 includes a client device 610, a server 620, a server 630, and a server 640, connected by one or more network(s) 650. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 6, but particularly the servers, can be implemented in data centers, server farms, etc.

Certain components of the devices shown in FIG. 6 may be referred to herein by parenthetical reference numbers. For the purposes of the following description, the parenthetical (1) indicates an occurrence of a given component on client device 610, (2) indicates an occurrence of a given component on server 620, (3) indicates an occurrence on server 630, and (4) indicates an occurrence on server 640. Unless identifying a specific instance of a given component, this document will refer generally to the components without the parenthetical.

Generally, the devices 610, 620, 630, and/or 640 may have respective processing resources 601 and storage resources 602, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 610 can include preprocessing module 603(1), alignment module 604(1), and enhancement module 605(1). The preprocessing module 603(1) can preprocess signals to obtain features. The features can be input to alignment module 604(1), which can align the signals, e.g., using the encoding techniques described above. The aligned and signals can be enhanced using enhancement module 605(1) using recurrence processing, decoding, and predicting/applying of masks to signals as described above. Servers 620 and 630 can have respective instances of these modules, e.g., preprocessing module 603(2), alignment module 604(2), and enhancement module 605(2) on server 620 and preprocessing module 603(3), alignment module 604(3), and enhancement module 605(3) on server 630. Collectively, the preprocessing, alignment, and enhancement modules can implement signal enhancement workflow 100, described above with respect to FIG. 1.

Server 640 can include training module 641, which can train respective instances of the preprocessing, alignment, and/or enhancement modules as described elsewhere herein. For instance, training module 641 can implement training workflow 200, described above with respect to FIG. 2.

Example Alignment Method

Figure 7:
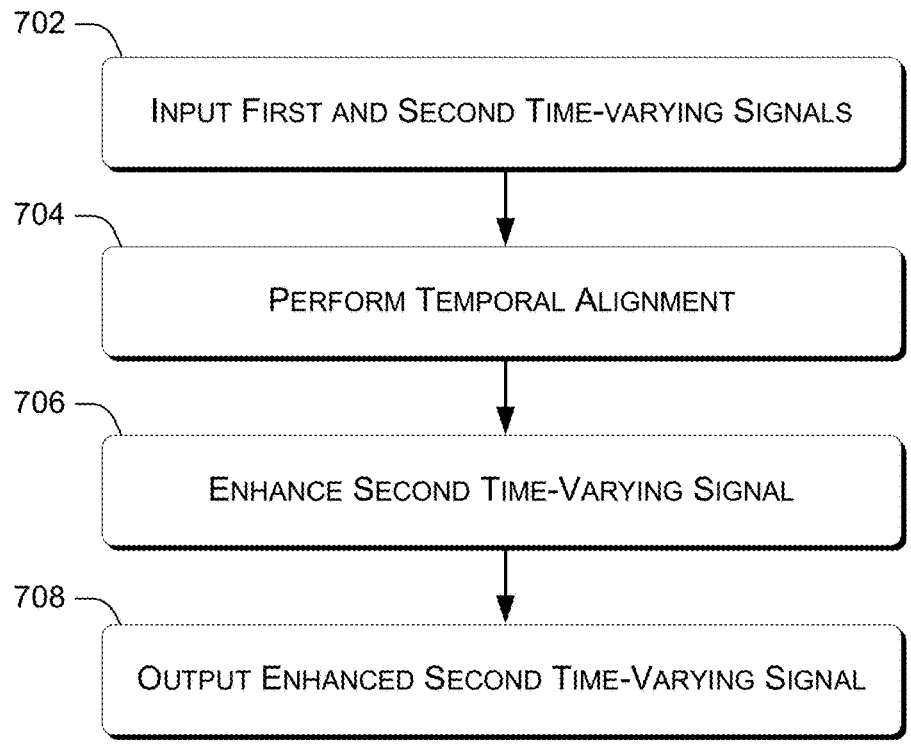
FIG. 7 illustrates an example method or technique for alignment and enhancement of time-varying signals, consistent with some implementations of the disclosed techniques.

FIG. 7 illustrates an example method 700, consistent with some implementations of the present concepts. Method 700 can be implemented on many different types of devices, e.g., by one or more cloud servers, by a client device such as a laptop, tablet, or smartphone, or by combinations of one or more servers, client devices, etc.

Method 700 begins at block 702, where first and second time-varying signals are input to a trained model. For instance, the trained model can be a deep neural network with an internal alignment layer. In addition, the model can also perform encoding, decoding, recurrence, and/or mask prediction processing.

Method 700 continues at block 704, where the first time-varying signal is temporally aligned with the second time-varying signal. For instance, an encoder of the trained model can include the internal alignment layer. The internal alignment layer can align the signals by producing a weighted representation of the first time-varying signal. The internal alignment layer can produce the weighted representation using an attention technique that weights embeddings representing the first time-varying signal based on their similarity an embedding representing the second time-varying signal.

Method 700 continues at block 706, where the second time-varying signal is enhanced. For instance, the recurrence, decoding, and/or mask prediction processing can be performed after temporal alignment. Predicted masks can be employed to enhance the second time-varying signal, e.g., by selectively suppressing different frequency components to remove echoes and/or noise.

Method 700 continues at block 708, where the enhanced second time-varying signal is output. For instance, the enhanced second time-varying signal can be played back over a speaker, sent over a network to another device for playback, and/or stored on persistent storage for future playback.

Block 702 can be performed by preprocessing module 603, block 704 can be performed by alignment module 604, and blocks 706 and 708 can be performed by enhancement module 605.

Example Training Method

Figure 8:
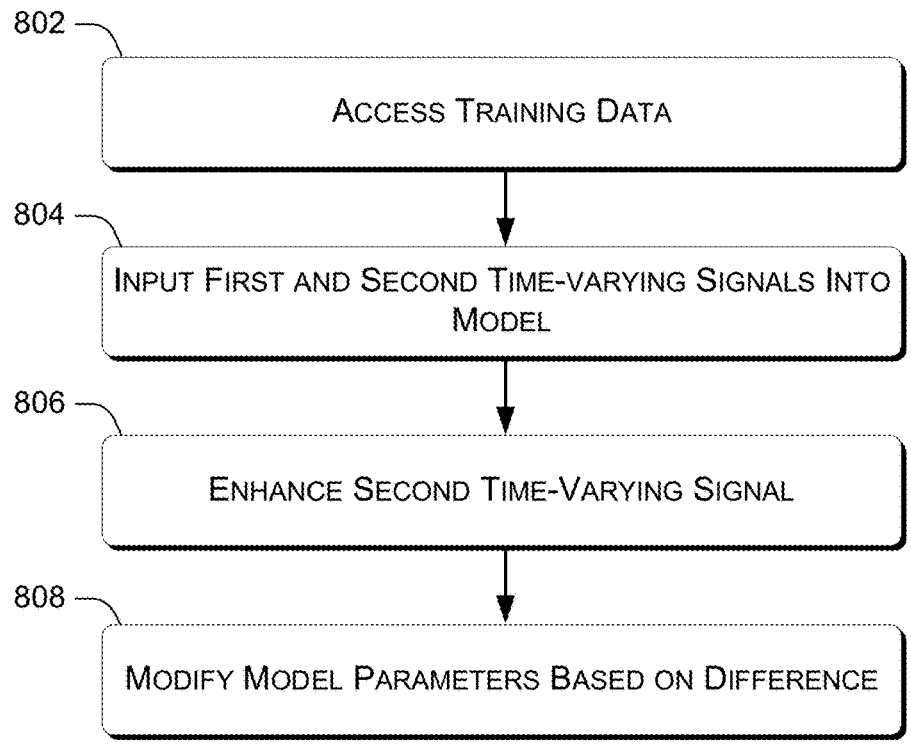
FIG. 8 illustrates an example method or technique for training of a model to perform alignment and enhancement of time-varying signals, consistent with some implementations of the disclosed techniques.

FIG. 8 illustrates an example method 800, consistent with some implementations of the present concepts. Method 800 can be implemented on many different types of devices, e.g., by one or more cloud servers, by a client device such as a laptop, tablet, or smartphone, or by combinations of one or more servers, client devices, etc.

Method 800 begins at block 802, where training data is accessed. In some cases, block 802 can include accessing previously-generated training data, or can include generating the training data as described previously. The training data can include first time-varying signals, second time-varying signals, and target time-varying signals. For audio enhancement scenarios, the first time-varying signals can include far end signals for playback by a loudspeaker, the second time-varying signals can include microphone signals detected by a microphone that picks up the far end signals played back by the loudspeaker, and the target time-varying signals can include near end signals that represent an ideal microphone signal having little or no echoes or noise.

Method 800 continues at block 804, where the first time-varying signals and the second time-varying signals are input into a model having an attention layer. For instance, the attention layer may perform alignment of the first time-varying signals to the second time-varying signals to produce temporally-aligned first time-varying signals. For instance, the attention layer can perform weighting of multiple far end frames based on similarity to a microphone frame to obtain a weighted far end frame, e.g., using a linear projection (embedding) of the microphone frame as a query and linear projections of the far end frames as keys. In some cases, the weighting can be performed using a softmax layer that determines a weight vector, and the weighted far end frame can include a sum of the far end frames as weighted by the weight vector.

Method 800 continues at block 806, where the second time-varying signals are enhanced based on the temporally-aligned first time-varying signals. For instance, the model can have subsequent layers after the attention layer that produce values, such as suppression masks, which can be used for enhancing the second time-varying signals. In some cases, the suppression masks can be determined in a decoding layer.

Method 800 continues at block 808, where internal parameters of the model are updated (e.g., by modifying previous internal parameters) based on the difference between the target signals and the enhanced second time-varying signals. For instance, if the target signals represent ideal near end microphone signals and the enhanced second time-varying signals represent predicted near end microphone signals, the internal parameters can be modified to cause the model to remove echoes and/or noise so that the predicted near end microphone signals become relatively more similar to the ideal near end microphone signals.

Blocks 802, 804, 806, and 808 can be performed by training module 641.

First Example User Experience

Figure 9:
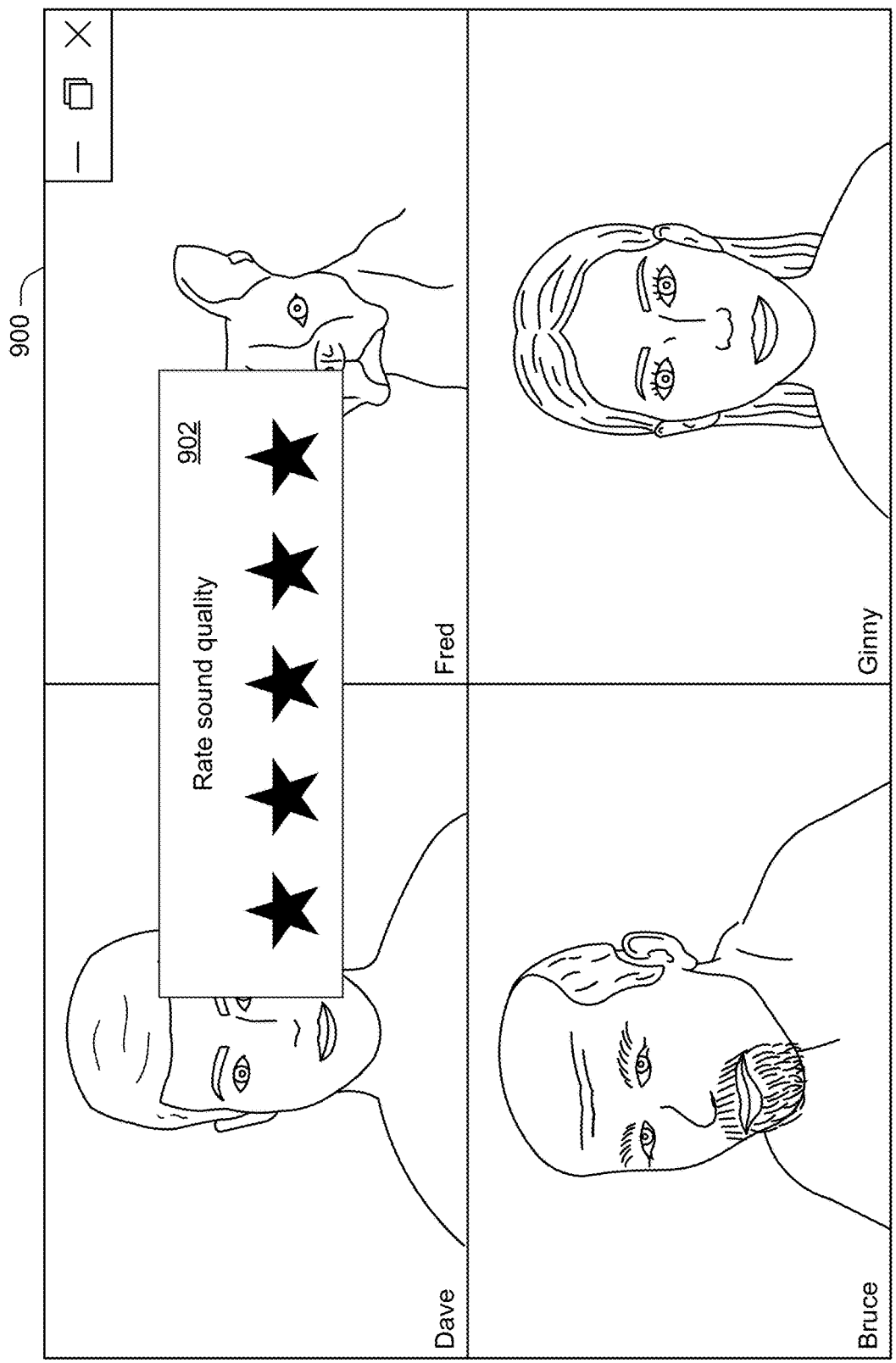
FIG. 9 illustrates an example user experience, consistent with some implementations of the present concepts.

The disclosed techniques can result in improved sound quality via echo (and potentially noise) cancellation. FIG. 9 illustrates a video call GUI 900 includes a sound quality estimate 902 that conveys a value of five stars out of five for the audio signal of a video call. In some cases, user estimates of signal quality can be used to manually label audio or video content of the call for subsequent training and/or tuning of various enhancement models that employ the signal alignment techniques described herein. For instance, user estimates of five-star signal quality for microphone signals enhanced during the call could be employed as examples of target near end signals. The corresponding raw microphone and far end signals recorded during the call can be provided with the enhanced microphone signals as training examples. In other cases, however, training examples can be generated synthetically or by using trained quality estimation models to rate the quality of training signals based on the presence or absence of impairments in the training signals.

Second Example User Experience

Figure 10:
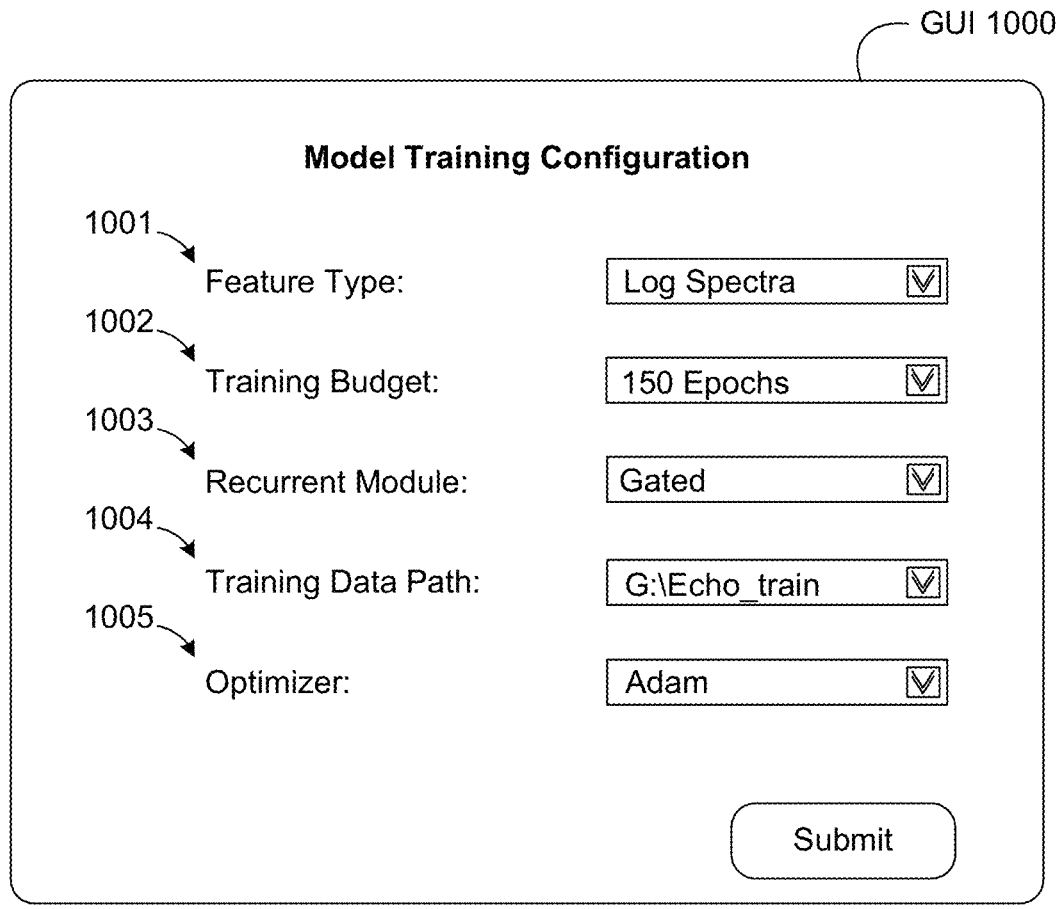
FIG. 10 illustrates an example user interface, consistent with some implementations of the present concepts.

FIG. 10 illustrates an example configuration graphical user interface ("GUI") 1000 that can be presented via training module 641 to configure certain aspects of training. For instance, feature type element 1001 allows the user to pick the type of features used for training. Here, the user has selected log spectra, and the GUI may provide other feature type options such as linear audio spectrogram features. Training budget element 1002 allows the user to pick the training budget. Here, the user has selected 150 training epochs. The GUI may provide other options, such as an option to use all available training data, to specify a convergence condition, etc. In some cases, a text editor is employed to edit the text of training code and/or configuration files.

Recurrent module element 1003 allows the user to select a type of recurrent module to use. Here, the user has selected a gated module such as a gated recurrent unit. The GUI may provide other options, such as an option to select an LSTM recurrent module. Training data path element 1004 allows the user to pick the training data path. Optimizer element 1005 allows the user to pick the optimizer. Here, the user has selected the Adam optimizer, and the GUI may provide other options such as stochastic gradient descent.

When the user clicks submit, the training module 641 can configure itself according to the user selections entered to configuration GUI 1000. Note that the examples of elements shown in FIG. 10 are for example purposes, and that other types of elements can be used to specify other aspects of training. For instance, a configuration GUI can be provided with elements to configure the architecture of a neural network, e.g., by specifying the number and/or type of layers and how the layers are connected. For instance, the configuration GUI could be employed to add or remove convolutional layers, pooling layers, transpose convolution layers, recurrent layers, and/or skip connections to the model. The configuration GUI can also be used to select the number of kernels for each convolution layer, the type of pooling for pooling layers, etc. In addition, users can configure other training aspects such as max delay, frame size, hop size, etc.

Technical Effect

The disclosed implementations offer several technical improvements over conventional signal alignment techniques that use a separate delay block for aligning signals prior to enhancement processing. By incorporating an alignment module into a machine learning model with subsequent layers that perform signal enhancement, the internal parameters of the alignment module can be trained jointly with the internal parameters of the layers of the model that enhance the signal. As a consequence, the alignment layer can learn to produce temporally-aligned signals that facilitate subsequent enhancement processing.

As a related point, conventional separate delay blocks result in a "hard" delay. That is, one time-varying signal is delayed by a specified amount to the best match of another time-varying signal. However, as previously noted, in some cases the current frame of a given signal can temporally straddle two adjacent frames in another signal, e.g., one signal may be delayed by a fractional number of frames relative to another signal. For example, assuming a 10-millisecond hop, if the first signal is 15 milliseconds delayed from the second signal, then conventional methods can only delay the first signal 10 milliseconds or 20 milliseconds and select the specific frame from the first signal that occurs 10 or 20 milliseconds before the current frame of the second signal. The disclosed implementations can blend the two closest frames of the first signal to more closely match the current frame of the second signal using a weighted self-attention mechanism described above.

There are several technical problems addressed by using an internal alignment layer as described above. First, software buffering and hardware latency can result in significant delay variance between the far end signal and the microphone signal. The disclosed implementations can accurately estimate delay even when buffering or hardware issues cause the delay to vary significantly during the course of a single call. For instance, an internal alignment layer that uses attention can adapt more quickly to changes in delay than the smoothing and/or averaging operations generally employed in correlation analysis. In addition, users may sometimes change their physical location during a call, moving to a room with a different microphone and/or speaker. Or a user may choose to use a different microphone and/or speaker during a call even without leaving the room, e.g., by putting on a USB headset during a call after initially using a built-in speaker and microphone on their laptop. An internal alignment layer can adapt quickly to changes in far end signal to microphone delay that can occur in these circumstances.

In addition, as noted above, an enhancement model with an internal alignment layer has been demonstrated to improve echo cancellation relative to other approaches using different evaluation metrics, such as AECMOS, MOS, and ERLE. Furthermore, in addition to improving the ability of a model to cancel echoes and/or reduce noise, the use of an internal alignment layer also resulted in a model that reduces execution times by approximately 10% compared to other techniques. Thus, the disclosed implementations provide for temporal signal alignment that not only improves the ability of a model to align and enhance signals, but to do so in a computationally efficient manner.

FURTHER APPLICATIONS

The specific examples discussed above relate to echo removal for audio processing applications. However, any two time-varying signals can be aligned consistently with the disclosed implementations. For example, consider two microphones located at different distances from a speaker. The audio signal from one microphone can be delayed using an internal alignment module as described herein to temporally align both microphone signals. Even if the microphones are worn by speakers that move further apart or closer together during the course of a discussion, the disclosed signal alignment techniques can adapt quickly to align the two signals.

As another example, consider two radar signals that are detected by an antenna. One signal may be an echo of another signal, e.g., a fighter jet radar might have line-of-sight to the antenna and another signal might reflect off of a nearby mountain and arrive at the antenna somewhat later than the line-of-sight signal. The disclosed implementations can be used to accurately estimate the delay between the two signals. Using the estimated delay, echoes and/or noise introduced by the reflected radar signal can be removed from the line-of-sight signal to result in an enhanced signal that is less susceptible to problems such as false target identification.

Device Implementations

As noted above with respect to FIG. 6, system 600 includes several devices, including a client device 610, a server 620, a server 630, and a server 640. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), neural processing units (NPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 650. Without limitation, network(s) 650 can include one or more local area networks (LANs), wide area networks (WANs), the Internet, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

Various examples are described above. Additional examples are described below. One example includes a method comprising inputting a first time-varying signal and a second time-varying signal into a trained model, performing temporal alignment of the first time-varying signal to the second time-varying signal using an attention layer of the trained model to obtain a temporally-aligned first time-varying signal, enhancing the second time-varying signal based at least on the temporally-aligned first time-varying signal, and outputting the enhanced second time-varying signal.

Another example can include any of the above and/or below examples where the first time-varying signal and the second time-varying signal comprise audio signals.

Another example can include any of the above and/or below examples where the first time-varying signal comprises a far end signal and the second time-varying signal comprises a microphone signal Another example can include any of the above and/or below examples where the enhanced second time-varying signal comprises a predicted near end signal, the enhancing comprises removing at least one of noise, distortions, or echoes from the microphone signal Another example can include any of the above and/or below examples where the performing temporal alignment comprises weighting multiple far end frames of the far end signal based at least on similarity of the multiple far end frames to a microphone frame of the microphone signal to obtain a weighted far end frame and the weighted far end frame representing alignment of the far end signal to the microphone signal.

Another example can include any of the above and/or below examples where the weighting comprises using a linear projection produced from the microphone frame as a query and linear projections produced from the multiple far end frames as keys.

Another example can include any of the above and/or below examples where the weighting comprises calculating a weight vector having weights corresponding to similarity of the query to each of the keys.

Another example can include any of the above and/or below examples where the weighting is performed using a softmax layer and the similarity is computed using a dot product operation on the query and each of the keys.

Another example can include any of the above and/or below examples where the weighted far end frame comprises a sum of the multiple far end frames weighted by the weight vector.

Another example can include any of the above and/or below examples where the enhancing comprises determining suppression masks and modifying the microphone signal using the suppression masks.

Another example can include any of the above and/or below examples where the suppression masks are determined by one or other layers of the trained model that have been trained jointly with the attention layer.

Another example includes a system comprising a processor and a storage medium storing instructions which, when executed by the processor, cause the system to access training data including first time-varying signals, second time-varying signals, and target time-varying signals, input the first time-varying signals and the second time-varying signals into a model having an attention layer that aligns the first time-varying signals to the second time-varying signals to obtain temporally-aligned first time-varying signals, enhance the second time-varying signals based at least on the temporally-aligned first time-varying signals to obtain enhanced second time-varying signals, and modify parameters of the model based at least on a difference between the enhanced second time-varying signals and the target time-varying signals.

Another example can include any of the above and/or below examples where the target time-varying signals comprise speech clips, the first time-varying signals comprise far end signals generated from the speech clips, and the second time-varying signals comprise microphone signals generated from the speech clips.

Another example can include any of the above and/or below examples where the parameters being modified based at least on a loss function calculated using frequency-domain representations of the enhanced second time-varying signals and the target time-varying signals.

Another example can include any of the above and/or below examples where the loss function has a magnitude term and a phase-aware term.

Another example can include any of the above and/or below examples where the model outputs suppression masks and the enhanced second time-varying signals are obtained by modifying the microphone signals using the suppression masks.

Another example can include any of the above and/or below examples where the instructions, when executed by the processor, cause the system to jointly train the attention layer and one or more other layers of the model that output the suppression masks using the training data.

Another example can include any of the above and/or below examples where the model is being trained to suppress echoes.

Another example includes a computer-readable storage medium storing instructions which, when executed by a computing device, cause the computing device to perform acts comprising receiving a first time-varying signal and a second time-varying signal and aligning the first time-varying signal to the second time-varying signal using an attention layer of a neural network.

Another example can include any of the above and/or below examples where the first time-varying signal and the second time-varying signal comprises different audio signals picked up by different microphones.

The invention claimed is:

1. A method comprising:
   inputting a first time-varying signal acquired by a sensor, a second time-varying signal acquired by the sensor, and a target time-varying signal corresponding to an ideal signal into a trained model having an attention layer, the first time-varying signal and the second time-varying signal comprising audio signals;
   aligning the first time-varying signal to the second time-varying signal to obtain a temporally-aligned first time-varying signal at the attention layer by:
   weighting multiple far end frames of the second time-varying signal a far end signal based at least on a similarity of the multiple far end frames to a frame of the first time-varying signal to obtain weighted far end frames, wherein the multiple far end frames are weighted relative to each other; and
   blending ones of the weighted multiple far end frames;
   enhancing the second time-varying signal based at least on the temporally-aligned first time-varying signal, the enhanced second time-varying signal representing a predicted ideal signal, wherein the enhancing includes selectively suppressing different frequency components;
   modifying parameters of the trained model based on a difference between the enhanced second time-varying signal and the target time-varying signal;
   enhancing a subsequent time-varying signal based on the modified parameters; and
   outputting the enhanced second time-varying signal.

2. The method of claim 1, the first time-varying signal comprising a far end signal and the second time-varying signal comprising a microphone signal.

3. The method of claim 2, the enhanced second time-varying signal comprising a predicted near end signal, the enhancing comprising removing at least one of noise, distortions, or echoes from the microphone signal.

4. The method of claim 3, wherein a weighted far end frame of the multiple far end frames represents an alignment of the far end signal to the microphone signal.

5. The method of claim 4, wherein the weighting comprises using a linear projection produced from the frame as a query and linear projections produced from the multiple far end frames as keys.

6. The method of claim 5, wherein the weighting comprises calculating a weight vector having weights corresponding to similarity of the query to each of the keys.

7. The method of claim 6, wherein the weighting is performed using a softmax layer and the similarity is computed using a dot product operation on the query and each of the keys.

8. The method of claim 7, wherein the weighted far end frame comprises a sum of the multiple far end frames weighted by the weight vector.

9. The method of claim 8, wherein the suppression masks are determined by one or other layers of the trained model that have been trained jointly with the attention layer.

10. A system comprising:
a processor; and
a storage medium storing instructions which, when executed by the processor, cause the system to:
access training data including first time-varying signals acquired by a sensor, second time-varying signals acquired by the sensor, and target time-varying signals corresponding to ideal signals;
input the first time-varying signals and the second time-varying signals into a model having an attention layer that aligns the first time-varying signals to the second time-varying signals to obtain temporally-aligned first time-varying signals, the first time-varying signal and the second time-varying signal comprising audio signals, wherein the temporally-aligned first time-varying signals are obtained by:
weight multiple far end frames of the second time-varying signals based at least on a similarity of the multiple far end frames to frames of the first time-varying signals to obtain weighted far end frames, wherein the multiple far end frames are weighted relative to each other; and
blend ones of the weighted multiple far end frames;
enhance the second time-varying signals based at least on the temporally-aligned first time-varying signals to obtain enhanced second time-varying signals, the enhanced second time-varying signals representing a predicted ideal signals, wherein the enhancing includes selectively suppressing different frequency components;
modify parameters of the model based at least on a difference between the enhanced second time-varying signals and the target time-varying signals;
enhance a subsequent time-varying signals based on the modified parameters; and
output the enhanced second time-varying signal.

11. The system of claim 10, wherein the target time-varying signals comprise speech clips, the first time-varying signals comprise far end signals generated from the speech clips, and the second time-varying signals comprise microphone signals generated from the speech clips.

12. The system of claim 11, the parameters being modified based at least on a loss function calculated using frequency-domain representations of the enhanced second time-varying signals and the target time-varying signals.

13. The system of claim 12, the loss function having a magnitude term and a phase-aware term.

14. The system of claim 11, wherein the model outputs suppression masks and the enhanced second time-varying signals are obtained by modifying the microphone signals using the suppression masks.

15. The system of claim 14, wherein the instructions, when executed by the processor, cause the system to jointly train the attention layer and one or more other layers of the model that output the suppression masks using the training data.

16. The system of claim 15, the model being trained to suppress echoes.

17. A computer-readable storage medium storing instructions which, when executed by a computing device, cause the computing device to perform acts comprising:
inputting a first time-varying signal acquired by a sensor, a second time-varying signal acquired by the sensor, and a target time-varying signal corresponding to an ideal signal into a trained model having an attention layer, the first time-varying signal and the second time-varying signal comprising audio signals;
aligning the first time-varying signal to the second time-varying signal to obtain a temporally-aligned first time-varying signal at the attention layer by:
weighting multiple far end frames of the second time-varying signal a far end signal based at least on a similarity of the multiple far end frames to a frame of the first time-varying signal to obtain weighted far end frames, wherein the multiple far end frames are weighted relative to each other; and
blending ones of the weighted multiple far end frames;
enhancing the second time-varying signal based at least on the temporally-aligned first time-varying signal, the enhanced second time-varying signal representing a predicted ideal signal, wherein the enhancing includes selectively suppressing different frequency components;
modifying parameters of the trained model based on a difference between the enhanced second time-varying signal and the target time-varying signal;
enhancing a subsequent time-varying signal based on the modified parameters; and
outputting the enhanced second time-varying signal.

18. The computer-readable storage medium of claim 17, the first time-varying signal and the second time-varying signal comprising different audio signals picked up by different microphones.

* * * * *